United States Patent [19]

Clegg

[11] Patent Number: 4,609,261
[45] Date of Patent: Sep. 2, 1986

[54] CONICAL MICROSCOPIC LENS

[76] Inventor: John E. Clegg, 2320 Keystone Dr., Orlando, Fla. 32806

[21] Appl. No.: 671,717

[22] Filed: Nov. 15, 1984

[51] Int. Cl.$^4$ .................. G02B 13/18; G02B 17/08
[52] U.S. Cl. ..................................... 350/432; 350/443
[58] Field of Search ........................... 350/432, 443

[56] References Cited

U.S. PATENT DOCUMENTS

| 2,881,654 | 4/1959 | Toffolo | 350/432 |
|---|---|---|---|
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |
| 4,492,438 | 1/1985 | Clegg | 350/432 |

Primary Examiner—John K. Corbin
Assistant Examiner—Rebecca D. Gass

[57] ABSTRACT

A conical microscopic stage lens comprising four component lenses which receive an incipient beam, refract the beam four times and emit an enlarged beam. The stage lens has four refractive sections (faces), four transmissive sections and one reflective section.

1 Claim, 2 Drawing Figures

CONICAL MICROSCOPIC LENS

BACKGROUND

The code designation of the lens is M:LRT-3RT:C (M—magnifying stage lens, L—reflecting section of a component lens, R—refracting section of a component lens, T—transmitting section of a component lens, and C—concentrating stage lens).

Prior art includes the *Conical Split-Image Microscopic Lens,* U.S. Pat. No. 4,277,148, July 7, 1981, by this inventor. This lens splits the incipient beam in much the same way as the subject disclosure but it does so with a concave conical section instead of a reflective section.

DRAWINGS

DESCRIPTION

Figure 1:
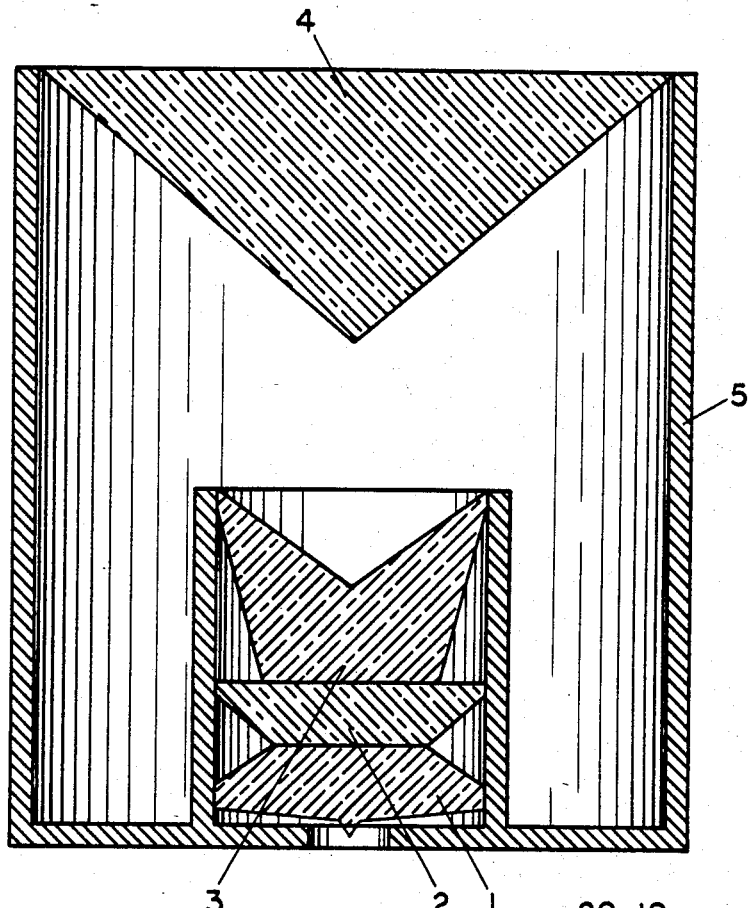
FIG. 1 is an elevation of the conical microscopic lens with the lenses shown in section.

FIG. 1 shows the conical microscopic lens with lower component lens LRT 1, first middle component lens RT 2, second middle component lens RT 3 and upper component lens RT 4 mounted inside tubular casing 5.

Figure 2:
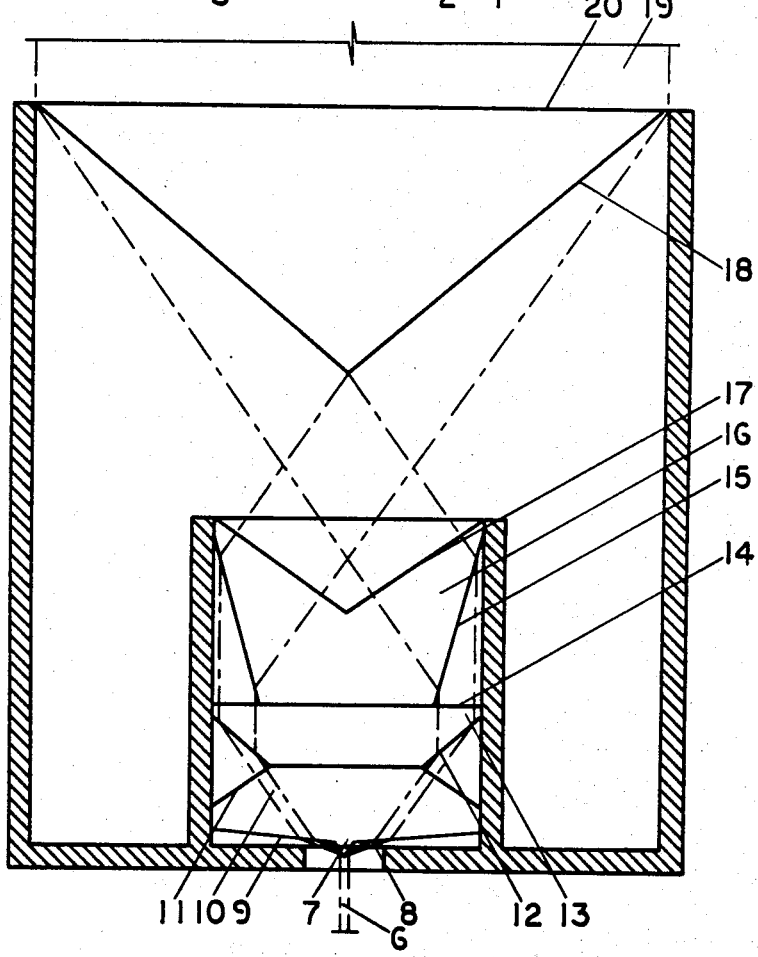
FIG. 2 is an elevation of the lens with a ray diagram.

FIG. 2 shows the conical microscopic lens with a ray diagram. Incipient image beam 6 is reflected by convex conical reflective section 7, forming inverted divergent conical beam 8. In conical optics inversion refers to the displacement of the outside of a beam to the inside and the inside of the beam to the outside. Beam 8 is refracted by convex conical section 9, forming divergent conical beam 10 which is emitted by convex conical section 11.

Beam 10 is refracted by convex conical section 12, forming annular beam 13 which is emitted by planar section 14.

Beam 13 is refracted by convex conical section 15, forming inverted convergent-divergent conical beam 16 which is emitted by concave conical section 17. This second inversion returns the displaced outside portion of the beam to the outside and presents a true image.

Beam 16 is refracted by convex conical section 18, forming enlarged whole beam 19 which emitted by planar section 20.

I claim:

1. A conical microscopic lens M:LRT-3RT:C comprising in general four component lenses which receive an incipient image beam of an object and emit an enlarged whole beam, and comprising in particular;

a lower component lens LRT (1) having a convex conical reflective section (7) which receives and reflects an incipient image beam (6) of an object, forming inverted divergent conical beam (8), having a convex conical section (9) which refracts said inverted divergent conical beam (8), forming divergent conical beam (10), and having a convex conical section (11) which emits said divergent conical beam (10), a first middle commponent lens RT (2) mounted above said lower component lens LRT (1) and having a convex conical section (12) which refracts said divergent conical beam (10), forming an annular beam (13), and having a planar section (14) which emits said annular beam (13), a second middle component lens RT (3) mounted above said first middle component lens RT (2) and having a convex conical section (15) which refracts said annular beam (13), forming inverted convergent-divergent conical beam (16), and having a concave conical section (17) which emits said inverted convergent-divergent beam (16), and an upper component lens RT (4) mounted above said second middle component lens RT (3) and having a convex conical section (18) which refracts said inverted convergent-divergent beam (16), forming an enlarged whole beam (19), and having a planar section (20) which emits said enlarged whole beam (19).

* * * * *